US012160591B2

United States Patent
Wang et al.

(10) Patent No.: US 12,160,591 B2
(45) Date of Patent: Dec. 3, 2024

(54) METHOD, APPARATUS, AND COMPUTER PROGRAM PRODUCT FOR GRADUAL DECODING REFRESH FOR VIDEO ENCODING AND DECODING

(71) Applicant: NOKIA TECHNOLOGIES OY, Espoo (FI)

(72) Inventors: Limin Wang, San Diego, CA (US); Krit Panusopone, San Diego, CA (US); Seungwook Hong, San Diego, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 159 days.

(21) Appl. No.: 17/789,112

(22) PCT Filed: Dec. 15, 2020

(86) PCT No.: PCT/EP2020/086132
§ 371 (c)(1),
(2) Date: Jun. 24, 2022

(87) PCT Pub. No.: WO2021/130054
PCT Pub. Date: Jul. 1, 2021

(65) Prior Publication Data
US 2023/0031540 A1    Feb. 2, 2023

Related U.S. Application Data
(60) Provisional application No. 62/953,834, filed on Dec. 26, 2019.

(51) Int. Cl.
*H04N 19/167*  (2014.01)
*H04N 19/105*  (2014.01)
(Continued)

(52) U.S. Cl.
CPC ......... *H04N 19/167* (2014.11); *H04N 19/105* (2014.11); *H04N 19/159* (2014.11);
(Continued)

(58) Field of Classification Search
CPC .. H04N 19/105; H04N 19/107; H04N 19/159; H04N 19/167; H04N 19/172;
(Continued)

(56) References Cited

U.S. PATENT DOCUMENTS

| | | | |
|---|---|---|---|
| 2015/0381998 A1* | 12/2015 | Wang | H04N 19/40 375/240.16 |
| 2020/0204819 A1* | 6/2020 | Hsieh | H04N 19/105 |
| 2022/0014774 A1* | 1/2022 | Choi | H04N 19/117 |

OTHER PUBLICATIONS

Chen et al., "Algorithm Description for Versatile Video Coding and Test Model 7 (VTM 7)", Joint Video Experts Team (JVET) of ITU-T SG 16 WP 3 and ISO/IEC JTC 1/SC 29/WG 11, 16th Meeting, (Oct. 1-11, 2019), 90 pages.
(Continued)

*Primary Examiner* — Anner N Holder
(74) *Attorney, Agent, or Firm* — ALSTON & BIRD LLP

(57) ABSTRACT

A method, apparatus and a non-transitory computer readable medium are provided for receiving an input picture divided into a plurality of coding units (CUs) and comprising a virtual boundaries between a dirty area and a clean area of the input picture, each CU located within either the clean area or the dirty area. The virtual boundary is treated as a picture boundary for coding units within the clean area and as a non-boundary for coding units within the dirty area. For a current CU, a history-based motion vector prediction (HMVP) table can be prepared that identifies other CUs as HMVP candidates for inter prediction, the HMVP candidates being adjacent the current CU. The HMVP candidate CUs are limited to CUs previously coded in the clean area.
(Continued)

The current CU can be intra coded based at least upon the HMVP candidates from the HMVP table.

18 Claims, 8 Drawing Sheets

(51) Int. Cl.
*H04N 19/159* (2014.01)
*H04N 19/172* (2014.01)
*H04N 19/563* (2014.01)
*H04N 19/70* (2014.01)

(52) U.S. Cl.
CPC ......... *H04N 19/172* (2014.11); *H04N 19/563* (2014.11); *H04N 19/70* (2014.11)

(58) Field of Classification Search
CPC .... H04N 19/174; H04N 19/23; H04N 19/436; H04N 19/52; H04N 19/55; H04N 19/563; H04N 19/61; H04N 19/70
See application file for complete search history.

(56) References Cited

OTHER PUBLICATIONS

Gommelet et al., "Non-CE11: Non-CIP Normative Gradual Random Access", Joint Video Experts Team (JVET) of ITU-T SG 16 WP 3 and ISO/IEC JTC 1/SC 29/WG 11, 15th Meeting, (Jul. 3-12, 2019), 4 pages.

International Search Report and Written Opinion for Patent Cooperation Treaty Application No. PCT/EP2020/086132 dated Feb. 18, 2021, 16 pages.

Sullivan et al, "Meeting Report of the 15th JVET Meeting", Joint Video Experts Team (JVET) of ITU-T SG 16 WP 3 and ISO/IEC JTC 1/SC 29/WG 11, 15th Meeting, (Jul. 3-12, 2019), 409 pages.

Wang et al., "AHG9: Gradual Decoding Refresh for VVC", Joint Video Experts Team (JVET) of ITU-T SG 16 WP 3 and ISO/IEC JTC 1/SC 29/WG 11, 17th Meeting (Jan. 7-17, 2020), 6 pages.

Wang et al., "CE2: Test 2-3 Wavefront-Based Gradual Decoding Refresh (GDR)", Joint Video Experts Team (JVET) of ITU-T SG 16 WP 3 and ISO/IEC JTC 1/SC 29/WG 1, 16th Meeting, (Oct. 1-11, 2019), 6 pages.

* cited by examiner

METHOD, APPARATUS, AND COMPUTER PROGRAM PRODUCT FOR GRADUAL DECODING REFRESH FOR VIDEO ENCODING AND DECODING

CROSS-REFERENCE TO RELATED APPLICATIONS

This application is a national phase entry of International Application No. PCT/EP2020/086132, filed Dec. 15, 2020, which claims priority to U.S. Provisional Patent Application Ser. No. 62/953,834, filed on Dec. 26, 2019, the contents of which are hereby incorporated by reference in their entirety.

TECHNICAL FIELD

The present application relates generally to encoding and decoding of digital material. In an example embodiment, the present application relates to gradual decoding refresh for video encoding and decoding, such as for versatile video coding.

BACKGROUND

This section is intended to provide a background or context to the present disclosure, including that which is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Recently, the increased demand for storage, transmission, and streaming of higher quality and more complex images, videos, and other media content has led to greater computational complexity, higher bandwidth requirements, and increased costs of storage and transmission. As such, images and video can be compressed using image compression techniques such as inter prediction and intra prediction. Pixel values of a current picture are predicted with reference to information from another picture in accordance with an inter prediction method, and with reference to pixels in the same picture in accordance with an intra prediction method.

As such, a video coding system may comprise an encoder that transforms an input video into a compressed representation suited for storage/transmission and/or a decoder that can uncompress the compressed video representation back into a viewable form.

SUMMARY

Some embodiments provide a method for encoding and decoding video information. In other embodiments, an apparatus, a computer program product, and a computer-readable medium, are provided for encoding and decoding video information.

Various aspects of examples of the invention are provided in the detailed description.

For instance, according to a first aspect, there is provided a method comprising receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, an initial image may not necessarily be the very first image of a sequence of images, but may instead be an image that precedes one or more other images. In some embodiments, the method can further comprise moving the virtual boundary such that the one or more clean areas include the current coding unit intra coded based at least upon the HMVP candidates. In some embodiments, the method can further comprise preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the method can further comprise constructing a merge list comprising coding information for only coding units located within the one or more clean areas of the input picture.

According to a second aspect, there is provided an apparatus comprising at least one processor and at least one memory including computer program code with the at least one memory and the computer program code being configured to, with the at least one processor, cause the apparatus to perform at least: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, the at least one memory and the computer program code are further configured to, with the at least one processor, cause the apparatus to perform at least: moving the virtual boundary such that the one or more clean areas include the current coding unit intra coded based at least upon the HMVP candidates. In some embodiments, the at least one memory and the computer program code are further configured to, with the at least one processor, cause the apparatus to perform at least: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the at least one memory and the computer program code are further configured to, with the at least one processor, cause the apparatus to perform at least: constructing a merge list comprising coding information for only coding units located within the one or more clean areas of the input picture.

According to a third aspect, there is provided an apparatus comprising means for receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; means for preparing, for a current coding unit located in a dirty area, a history-based motion vector prediction (HMVP) table comprising one or more of the plurality of coding units, referred to as HMVP candidates, in a clean area; and means for intra coding the current coding unit based at least upon the HMVP candidates from the HMVP table. In some embodiments, the apparatus can further comprise means for moving the virtual boundary such that the one or more clean areas include the current coding unit intra coded based at least upon the HMVP candidates. In some embodiments, the apparatus can further comprise means for, preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and means for intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the apparatus can further comprise means for constructing a merge list comprising coding information for only coding units located within the one or more clean areas of the input picture.

According to a fourth aspect, there is provided a non-transitory computer-readable medium encoded with instructions that, when executed by a computer, perform: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, the non-transitory computer-readable medium can be further encoded with instructions that, when executed by the computer, perform: moving the virtual boundary such that the one or more clean areas include the current coding unit intra coded based at least upon the HMVP candidates. In some embodiments, the non-transitory computer-readable medium can be further encoded with instructions that, when executed by the computer, perform: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the non-transitory computer-readable medium can be further encoded with instructions that, when executed by the computer, perform: constructing a merge list comprising coding information for only coding units located within the one or more clean areas of the input picture.

According to a fifth aspect, there is provided a method comprising receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to a sixth aspect, there is provided an apparatus comprising at least one processor and at least one memory including computer program code, the at least one memory and the computer program code configured to, with the at least one processor, cause the apparatus to perform at least: receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to a seventh aspect, there is provided an apparatus comprising: means for receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: means for decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to an eighth aspect, there is provided a non-transitory computer-readable medium encoded with instructions that, when executed by processing circuitry, perform: receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

BRIEF DESCRIPTION OF THE DRAWINGS

For a more complete understanding of certain example embodiments of the present disclosure, reference is now made to the following descriptions taken in connection with the accompanying drawings in which.

DETAILED DESCRIPTION

Figure 1:
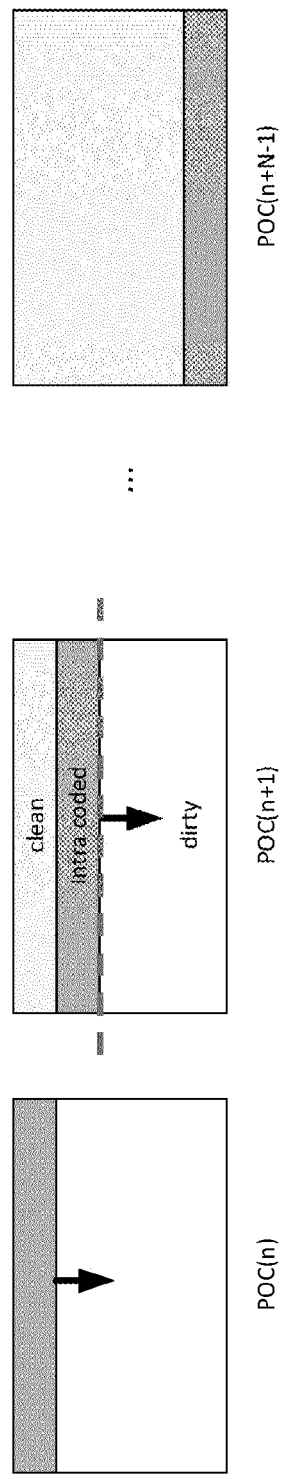
FIG. 1 illustrates an approach for vertical gradual random access (GRA) intra coding of a frame, according to an embodiment.

Various example embodiments and some of their potential advantages are understood by referring to FIGS. 1 through 8 of the drawings.

Some example embodiments will now further be described hereinafter with reference to the accompanying drawings, in which some, but not all, example embodiments are shown. One or more example embodiments may be embodied in many different forms and the claims should not be construed as being strictly limited to the example embodiments set forth herein; rather, these example embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with one or more example embodiments. Thus, use of any such terms should not be taken to limit the spirit and scope of example embodiments.

Additionally, as used herein, the term 'circuitry' refers to (a) hardware-only circuit implementations (e.g., implementations in analog circuitry, digital circuitry and/or any combination thereof); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that utilize software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit, an applications processor integrated circuit, a cellular network apparatus, other network apparatus, and/or other computing apparatus.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

Disclosed herein is a method, a computer readable medium and an apparatus for decoding an image using a wavefront-based gradual random access approach.

Many coding standards/approaches, such as the Joint Video Experts Team's (JVET) Versatile Video Coding (VVC) standard (JVET-N1001, VVC Draft 5, version 9, updated Jun. 25, 2019), the entire contents of which is hereby incorporated herein by reference, may provide for inter-prediction of coding units (CUs) based on neighboring CUs. Based on the current standard, a particular intra coding approach from among 67 or more available coding approaches can be selected for intra prediction of a pixel, coding tree unit (CTU), gradual random access (GRA) block, neighboring CUs, and/or the like.

In some embodiments, a picture can be divided into one or more tile rows and one or more tile columns. A tile is a sequence of CTUs that covers a rectangular region of a picture. In some embodiments, a tile is divided into one or more bricks, each of which consists of a number of CTU rows within the tile. In some embodiments, a tile that is not partitioned into multiple bricks is also referred to as a brick. However, a brick that is a true subset of a tile is not referred to as a tile. In some embodiments, a slice either contains a number of tiles of a picture or a number of bricks of a tile. In some embodiments, two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

In some embodiments, when a picture is coded using three separate colour planes (separate_colour_plane_flag is equal to 1), a slice contains only CTUs of one colour component being identified by the corresponding value of colour_plane_id, and each colour component array of a picture consists of slices having the same colour_plane_id value. Coded slices with different values of colour_plane_id within a picture may be interleaved with each other under the constraint that for each value of colour_plane_id, the coded slice network abstraction layer (NAL) units with that value of colour_plane_id shall be in the order of increasing CTU address in brick scan order for the first CTU of each coded slice NAL unit.

In some embodiments, the samples can be processed in units of coding tree blocks (CTBs). In some embodiments, the array size for each luma CTB in both width and height is CtbSizeY in units of samples. In some embodiments, the width and height of the array for each chroma CTB are CtbWidthC and CtbHeightC, respectively, in units of samples.

In some embodiments, each CTB is assigned a partition signaling to identify the block sizes for intra or inter prediction and for transform coding. In some embodiments, the partitioning is a recursive quadtree partitioning. In some embodiments, the root of the quadtree is associated with the CTB. In some embodiments, the quadtree is split until a leaf is reached, which is referred to as the quadtree leaf. In some embodiments, when the component width is not an integer number of the CTB size, the CTBs at the right component boundary are incomplete. In some embodiments, when the component height is not an integer multiple of the CTB size, the CTBs at the bottom component boundary are incomplete.

In some embodiments, the coding block is the root node of two trees, the prediction tree and the transform tree. In some embodiments, the prediction tree specifies the position and size of prediction blocks. In some embodiments, the transform tree specifies the position and size of transform blocks. In some embodiments, the splitting information for luma and chroma is identical for the prediction tree and may or may not be identical for the transform tree.

In some embodiments, spatial or component-wise partitioning can be carried out by the division of each picture into components, the division of each component into CTBs, the division of each picture into tile columns, the division of each picture into tile rows, the division of each tile column into tiles, the division of each tile row into tiles, the division of each tile into bricks, the division of each tile into CTUs, the division of each brick into CTUs, the division of each picture into slices, the division of each slice into bricks, the division of each slice into CTUs, the division of each CTU into CTBs, the division of each CTB into coding blocks, except that the CTBs are incomplete at the right component boundary when the component width is not an integer multiple of the CTB size and the CTBs are incomplete at the bottom component boundary when the component height is not an integer multiple of the CTB size, the division of each CTU into coding units, except that the CTUs are incomplete at the right picture boundary when the picture width in luma samples is not an integer multiple of the luma CTB size and the CTUs are incomplete at the bottom picture boundary when the picture height in luma samples is not an integer multiple of the luma CTB size, the division of each coding unit into transform units, the division of each coding unit into coding blocks, the division of each coding block into transform blocks, the division of each transform unit into transform blocks, and/or the like.

Gradual Random Access (GRA) was introduced for low delay applications and discussed in several previous JVET meetings. A Core Experiment (CE11) was formed for specific test conditions and further study at the 14th JVET meeting in March 2019.

According to at least some of the currently used video coding approaches, e.g., advanced video coding (AVC), high-efficiency video coding (HEVC), versatile video coding (VVC), etc., a coded video sequence consists of intra coded pictures (e.g., I picture) and inter coded pictures (e.g., P and B pictures). According to many, if not all current approaches, intra coded pictures typically require many more bits than inter coded pictures. As such, a transmission time of intra coded pictures increases the encoder to decoder delay as compared to similar inter coded pictures. For low and ultra-low delay applications, it is often desirable that all the coded pictures have similar number of bits so that the encoder to decoder delay can be reduced to around one picture interval. Hence, intra coded picture often cannot be used for low and ultra-low delay applications. However, on the other hand, an intra coded picture is indeed needed at random access points.

Gradual Decoding Refresh (GDR) often refers to the ability to start decoding at a non-IDR (Instantaneous Decoder Refresh) picture and to recover decoded pictures that are correct in content after decoding a certain amount of pictures. Said otherwise, GDR can be used to achieve random access from non-intrapictures. Approaches for GDR, such as Gradual Random Access (GRA) or Progressive Intra Refresh (PIR), can alleviate the delay issue with intra coded pictures. Instead of coding an intra picture at a random access point, GDR progressively refreshes pictures by spreading intra coded areas over several pictures.

A GDR picture often consists of one or more clean areas and one or more dirty areas, where clean areas may contain a forced intra area next to a dirty area for progressive intra refresh (PIR). In some embodiments, a picture, such as a GDR picture, can be divided vertically, horizontally, diagonally, or otherwise into a "clean" tile group area, a "refresh" tile group area, and a "dirty" or "not-yet-refreshed" tile group area. As such, as used herein, "clean area" refers to an area of CUs or CTUs within a picture that have already been refreshed, e.g., via intra prediction refresh. As used herein, "dirty area" refers to an area of CUs or CTUs within a picture that have not yet been refreshed, e.g., via intra prediction refresh. As used herein, "refresh area" refers to an area of CUs or CTUs within a picture that are being refreshed, e.g., by intra prediction refresh using only CUs or CTUs from within a "clean area" of the picture which has already been refreshed.

For example, according to a VVC approach according to a particular embodiment, a picture header can be used, the picture header comprising virtual boundary syntax. A virtual boundary can include or be one or more vertical or horizontal lines. In some embodiments, when virtual boundary syntax is included in a picture header, a picture can have its own virtual boundaries. For example, a GDR picture can define the boundary between a clean area and dirty area as a virtual boundary.

Figure 2:
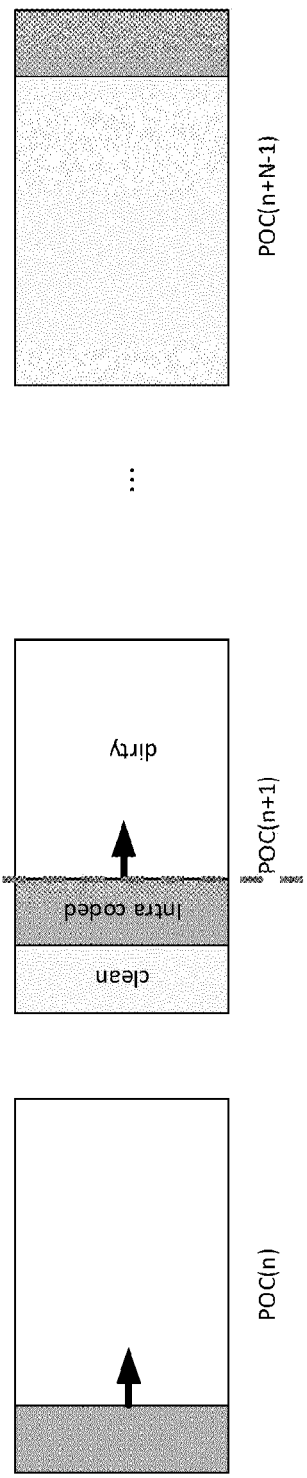
FIG. 2 illustrates an approach for horizontal GRA intra coding of a frame, according to an embodiment.

Referring now to FIGS. 1 and 2, unlike a clean random access (CRA) picture, a GRA picture, in general, consists of three areas; clean (lighter) area, intra coded area (darker) and dirty area (blank). For instance, FIG. 1 illustrates a vertical GRA approach while FIG. 2 illustrates a horizontal GRA approach. In vertical GRA, the intra coded area (darker) moves and the clean area (lighter) expands from left to right over pictures. In horizontal GRA, the intra coded area (darker) moves and the clean area (lighter) expands from top to bottom over pictures. In both the vertical GRA approach and horizontal GRA approach, as illustrated in FIGS. 1 and 2, the reference pixels for CUs in the intra coded area may be in the dirty area, and hence, some restrictions on intra prediction may need to be imposed.

As illustrated in the vertical GDR illustrated in FIG. 2, intra coded areas (darker) move from left to right over N pictures and the clean area (lighter) expends gradually from a random access point (POC(n)) within a picture order count (POC) to a recovery point POC(N+n) of the POC. A virtual boundary (dashed line) separates the clean area and the dirty area of a GDR picture. A virtual boundary (dashed line) is also illustrated in the horizontal GDR picture of FIG. 1.

According to the VVC standard and protocol, there are about 67 possible intra prediction modes for a current CU. Since the reference pixels for the CUs in the intra code area of a vertical or horizontal GRA may be in the dirty area (or not yet coded), these reference pixels are considered not available for intra coded prediction and the like. As such, the current solution, according to the current JVET VVC standard and according to CE11 is to simply eliminate any intra prediction modes that need to use the reference pixels in the dirty area. However, by eliminating some intra prediction modes, the overall coding performance suffers.

Furthermore, in order to identify an exact match at a recovery point, CUs in a clean area cannot use any coding information (e.g., reconstructed pixels, code mode, motion vectors (MVs), a reference line index (refIdx), etc.) from CUs in a dirty area. According to the current VVC approach, the encoder is responsible for making sure there is an exact match at a recovery point.

Often, a VVC encoder imposes restrictions on all coding tools for CUs in clean areas and ensures they will not touch any coding information in dirty area. By way of example only, coding tools can include, for example:
   a. In-loop filters,
   b. Intra prediction modes (directions),
   c. Intrablock copy (IBC),
   d. Regular inter modes with integer or fractional MVs,
   e. All the possible merge modes, such as regular, Affine, combined inter and intra prediction (CUP), merge with motion vector difference (MMVD), Triangle or GeoMerge, temporal motion vector prediction (TMVP), history-based motion vector prediction (HMVP), etc.
   f. Special coding tools, such as luma mapping and chroma scaling (LMCS), Local Dual Tree, etc.

Imposing and validating the restrictions on such coding tools for CUs in a clean area can be complex and time consuming, which may lead to an expensive and inefficient encoder with GDR functionality, as compared to a regular encoder.

For example, for intra CUs in a clean area, an encoder with GDR functionality may need to check and make sure that intra predictions will not use any reference samples in a dirty area of the current picture. For inter CUs in a clean area, an encoder with GDR functionality may need to check and make sure that the (interpolated) prediction blocks will not use any reconstructed pixels in dirty areas of reference pictures. For merge mode CUs in a clean area, a encoder with GDR functionality may need to check and make sure that temporal candidates in dirty areas of reference pictures will not be included in the merge list. For affine mode CUs in a clean area, an encoder with GDR functionality may need to check and make sure that the (interpolated) prediction blocks for each of the subblocks, e.g., 4×4 subblocks, will not use any reconstructed pixels in dirty areas of reference pictures. For triangle mode CUs in a clean area, an encoder with GDR functionality may need to perform validation at a proper stage, otherwise part of motion information may not be available. With inter CUs in a clean area, if it is necessary to build the merge list using, e.g., HMVP, an encoder with GDR functionality may need to avoid selecting the candidates associated with CUs in a dirty area of the current picture. These are just some of the drawbacks of the conventional VVC approach with regard to encoding complexity, time-consuming validation processes, and the delay differential between encoding and decoding.

As such, disclosed herein are embodiments of a method, as well as an apparatus and computer program product provided for carrying out such a method, for gradual decoding refresh for video encoding and decoding, e.g., according to the VVC approach. While various examples and embodiments are provided herein for the VVC protocol, the same or similar methods, apparatuses, and computer program products can be used for various other video encoding/decoding approaches or protocols.

In particular, in order to avoid such expensive validation processes, a modified VVC approach is described herein with regard to, for example, GDR applications. In some embodiments, for CUs in a clean area, virtual boundaries are treated as picture boundaries. In some embodiments, for CUs in a dirty area, virtual boundaries are treated as non-boundaries. In some embodiments, a separate HMVP table is built for CUs in a clean area, where the candidates only come from previously-coded CUs in a clean area.

In some embodiments, by making some or all of the above-mentioned modifications to the VVC approach, the complicated and expensive validation process is no longer necessary for encoders with GDR functionality.

The approaches described herein can be carried out by one or more of any suitable device, apparatus, computing equipment, server, remote computing device, and/or the like. For instance, video or images can be encoded to a bitstream or the like by a first device and the bitstream or the like of video or images can be transmitted or otherwise communicated from such a device to another such device for decoding, or a single device may carry out the encoding, storage, and decoding of the bitstream or the like. Described hereinbelow are some of the possible apparatuses, devices, systems, and equipment provided for carrying out any of the methods described herein, e.g., using any of the computer program code or computer-readable media described herein.

Figure 3:
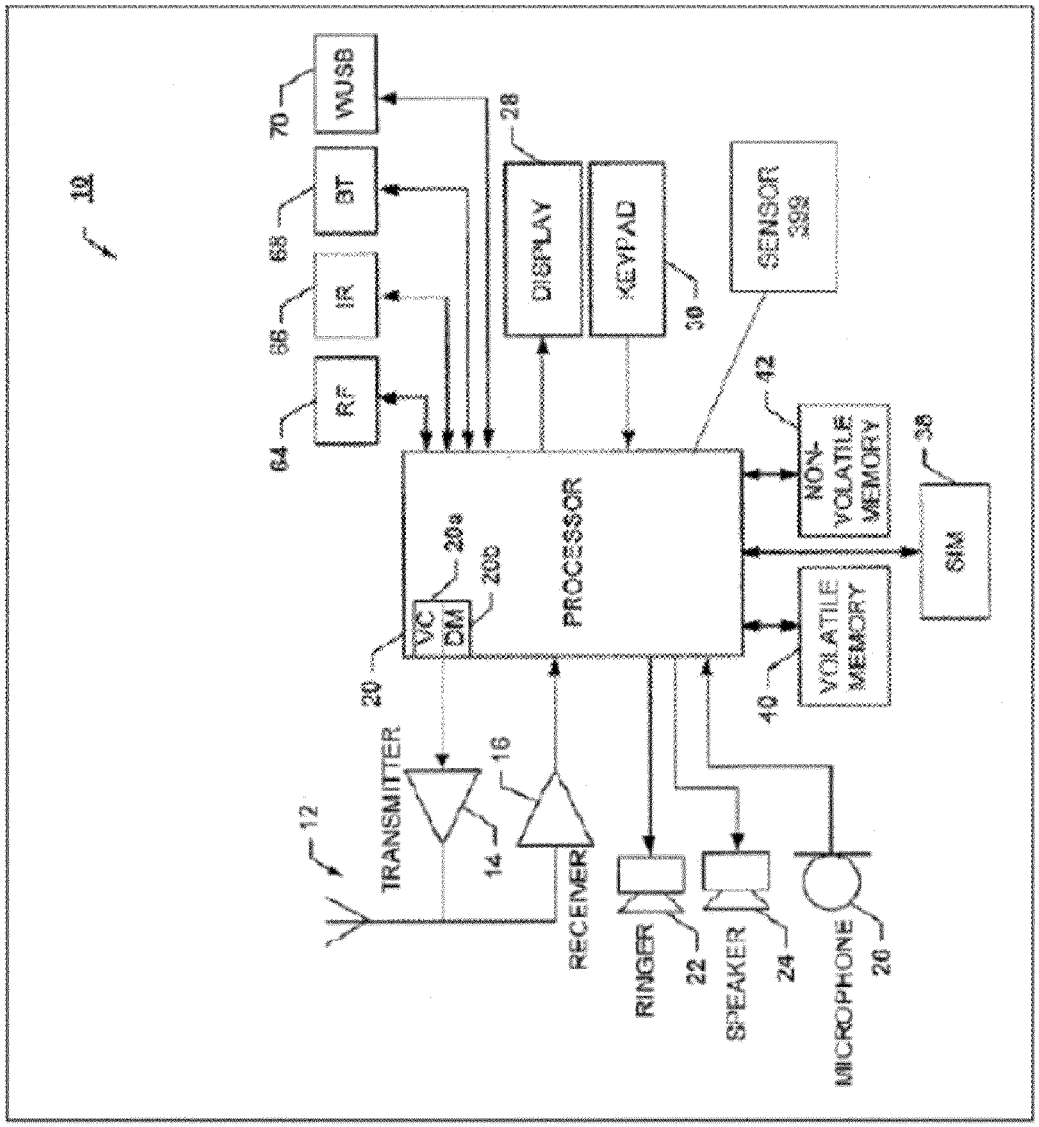
FIG. 3 illustrates an apparatus for carrying out at least some embodiments disclosed herein.

Referring now to FIG. 3, any of the encoding or decoding approaches or operations described herein may be carried out by an apparatus 10, which can comprise a video coding system, e.g., a video coding system comprising a codec, or another such electronic device or computing device.

In some embodiments, the video coding system may for example be a mobile terminal or user equipment of a wireless communication system. However, it is appreciated that at least some embodiments of the invention may be implemented within any electronic device or apparatus which may require encoding and decoding, such as the encoding or decoding of video images.

As illustrated in FIG. 3, the apparatus 10 can further comprise one or more processors 20 and one or more memory 40, 42. In some embodiments, the one or more memory 40, 42 can be configured to store computer program code comprising computer-readable instructions configured to cause the processor, with the memory, to carry out part or all of an encoding or a decoding method, as described herein. In some embodiments, the apparatus 10 can further comprise a communication interface, such as a transmitter 14 and/or a receiver 16.

In some embodiments, the apparatus 10 may comprise a housing for incorporating and protecting the device. The apparatus 10 further may comprise a user interface comprising at least a display 28, such as a liquid crystal display. In other embodiments, the display 28 may be any suitable display technology suitable to display an image or video. The user interface may further comprise a keypad. According to an embodiment, any suitable data or user interface mechanism may be employed. For example, the user interface may be implemented as a virtual keyboard or data entry system as part of a touch-sensitive display. The user interface may comprise a microphone 26 or any suitable audio input which may be a digital or analogue signal input. The user interface may further comprise an audio output device, which—according to an embodiment—may be any one of: an earpiece, speaker 24, or an analogue audio or digital audio output connection. The apparatus 10 may also comprise a battery (or in an embodiment, the device may be powered by any suitable mobile energy device, such as solar cell, fuel cell or clockwork generator). The apparatus may further comprise a camera capable of recording or capturing images and/or video. According to an embodiment, the apparatus 10 may further comprise an infrared port for short range line of sight communication to other devices. According to an embodiment, the apparatus 10 may further comprise any suitable short range communication solution such as for example a Bluetooth wireless connection or a universal serial bus (USB)/firewire wired connection.

The apparatus 10 may comprise a controller or processor 20 for controlling the apparatus 10. As used herein, "controller" and "processor" are used interchangeably. The processor 20 may be connected to the memory 40, 42, which according to an embodiment may store both data in the form of image and audio data and/or may also store instructions for implementation on the processor 20. The processor 20 may further be connected to codec circuitry suitable for carrying out coding and decoding of audio and/or video data or assisting in coding and decoding carried out by the processor 20.

In some embodiments, the apparatus 10 may represent a user equipment. The apparatus 10, or portions therein, may be implemented in other network nodes including base stations/WLAN access points as well as the other network nodes.

The apparatus 10 may include at least one antenna 12 in communication with a transmitter 14 and a receiver 16. Alternatively transmit and receive antennas may be separate. The apparatus 100 may also include a processor 20 configured to provide signals to and receive signals from the transmitter and receiver, respectively, and to control the functioning of the apparatus. Processor 20 may be configured to control the functioning of the transmitter and receiver by effecting control signalling via electrical leads or wirelessly to the transmitter and receiver. Likewise, processor 20 may be configured to control other elements of apparatus 100 by effecting control signalling via electrical leads or wirelessly connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

The apparatus 100 may be capable of operating with one or more air interface standards, communication protocols, modulation types, access types, and/or the like. Signals sent and received by the processor 20 may include signalling information in accordance with an air interface standard of an applicable cellular system, and/or any number of different wireline or wireless networking techniques, comprising but not limited to Wi-Fi, WLAN techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 100 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 100 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 100 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within about 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a universal integrated circuit card (UICC), an electronic UICC (eUICC), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the base stations/WLAN access points and network nodes including the UEs (see, e.g., method 70 and/or 80).

According to an embodiment, the apparatus 10 comprises a camera capable of recording or detecting individual frames which are then passed to the codec or controller for processing. According to another embodiment, the apparatus 10 may receive the video image data for processing from another device prior to transmission and/or storage. According to an embodiment, the apparatus 10 may receive either wirelessly or by a wired connection the image for coding/decoding.

In some embodiments, an arrangement for video coding may comprise a plurality of apparatuses, networks and network elements. In some embodiments, such a system may comprise multiple communication devices which can communicate through one or more networks. The system may comprise any combination of wired or wireless networks including but not limited to a wireless cellular telephone network (such as a Global System for Mobile operations (GSM) network, a Universal Mobile Telecommunications Service (UMTS) network, a Code-Division Multiple Access (CDMA) network, etc.), a wireless local area network (WLAN) such as defined by any of the Institute of Electrical and Electronics Engineers (IEEE) 802.x standards, a Bluetooth personal area network, an Ethernet local area network, a token ring local area network, a wide area network and the Internet.

The system may include both wired and wireless communication devices or apparatus 100 suitable for implementing embodiments. For example, the system may comprise or be in communication with a mobile telephone network and a representation of the internet. Connectivity to the internet may include, but is not limited to, long range wireless connections, short range wireless connections, and various wired connections including, but not limited to, telephone lines, cable lines, power lines, and similar communication pathways.

The example communication devices described as comprising the system may include, but are not limited to, an electronic device or apparatus 100, any combination of a personal digital assistant (PDA), a mobile telephone, an integrated messaging device (IMD), a desktop computer, a notebook computer or the like. The apparatus 10 may be stationary or mobile when carried by an individual who is moving. The apparatus 10 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection to a base station. The base station may be connected to a network server that allows communication between the mobile telephone network and the internet. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA) transmission control protocol-internet protocol (TCP-IP), short messaging service (SMS), multimedia messaging service (MMS) email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections and any suitable connection.

A video coder may comprise an encoder that transforms the input video into a compressed representation suited for storage/transmission, and/or a decoder is able to uncompress the compressed video representation back into a viewable form. The encoder may discard some information in the original video sequence in order to represent the video in more compact form (e.g., at a lower bitrate).

Hybrid video codecs, for example, codecs configured to operate in accordance with International Telecommunication Union—Telecommunication Standardization Sector (ITU-T) H.263 and H.264, encode the video information in two phases. At first, pixel values in a certain picture (or "block") are predicted for example by motion compensation techniques (finding and indicating an area in one of the previously coded video frames that corresponds closely to the block being coded) or by spatial means (using the pixel values around the block to be coded in a specified manner). Secondly, the prediction error, that is, the difference between the predicted block of pixels and the original block of pixels, is coded. This coding may be done by transforming the difference in pixel values using a specified transform (e.g., Discrete Cosine Transform (DCT) or a variant of it), quantizing the coefficients and entropy coding the quantized coefficients. By varying the fidelity of the quantization process, the encoder can control the balance between the accuracy of the pixel representation (picture quality) and size of the resulting coded video representation (file size of transmission bitrate).

In some video codecs, such as high-efficiency video coding (HEVC), video pictures are divided into coding units (CU) covering the area of the picture. A CU consists of one of more prediction units (PU) defining the prediction process for the samples within the CU and one or more transform units (TU) defining the prediction error coding process for the samples in the CU. A CU may consist of a square block of samples with a size selectable from a predefined set of possible CU sizes. A CU with the maximum allowed size may be named as CTU (coding tree unit) and the video picture is divided into non-overlapping CTUs. A CTU can be further split into a combination of smaller CUs, e.g. by recursively splitting the CTU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g., motion vector information for inter-predicted PUs and intra prediction directionality information for intra predicted PUs). Similarly, each TU is associated with information describing the prediction error decoding process for the samples within the TU (including, e.g., discrete cosine transform (DCT) coefficient information). It may be signaled at the CU level whether prediction error coding is applied or not for each CU. In the case there is no prediction errors residual associated with the CU, it can be considered there are no TUs for the CU. The division of the image into CUs, and division of CUs into PUs and TUs may be signaled in the bitstream allowing the decoder to reproduce the intended structure of these units.

The decoder reconstructs the output video by applying prediction techniques similar to the encoder to form a predicted representation of the pixel blocks (using the motion or spatial information created by the encoder and stored in the compressed representation) and prediction error decoding (inverse operation of the prediction error coding recovering the quantized prediction error signal in the spatial pixel domain). After applying prediction and prediction error decoding techniques, the decoder sums up the prediction and prediction error signals (pixel values) to form the output video frame. The decoder (and encoder) can also apply additional filtering to improve the quality of the output video before passing it for display and/or storing it as prediction reference for the forthcoming frames in the video sequence.

A Decoded Picture Buffer (DPB) may be used in the encoder and/or in the decoder. There are at least two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Figure 4:
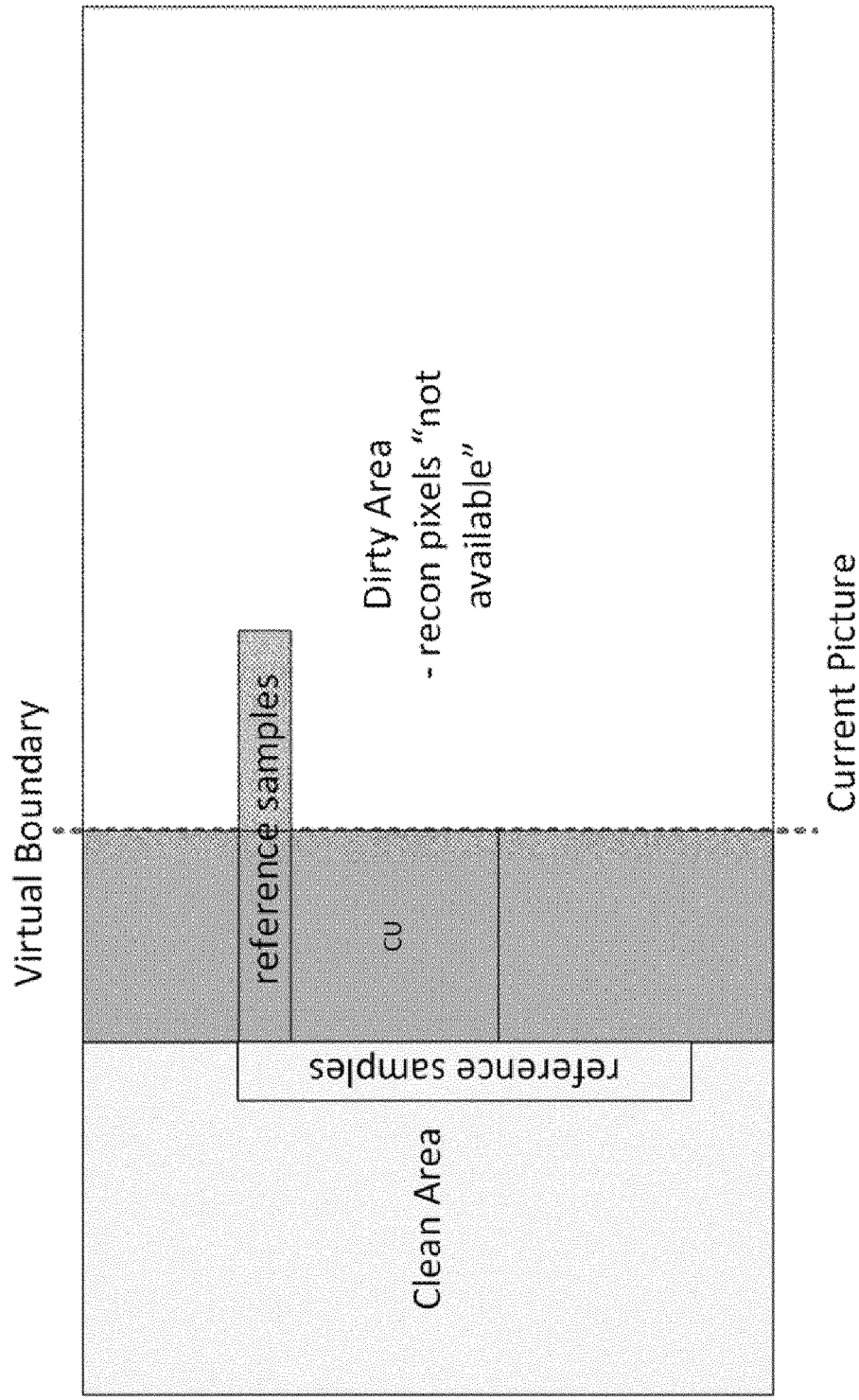
FIG. 4 illustrates an example coding unit in a clean area based on reference samples from within the clean area of the current picture, according to an embodiment.

Referring now to FIG. 4, an approach for gradual decoding refresh for VVC is illustrated. In some embodiments, since the virtual boundary is treated as a "picture boundary" for intra CUs in a clean area and the reference samples in a dirty area that are considered "not available," reference samples for CUs in the dirty area will be replaced by reference samples from the clean area. As illustrated in FIG. 4, for an intra CU (darker) in a clean area, some of its reference samples (labeled rectangular blocks) are in a dirty area and will therefore be replaced by reference samples from within the clean area.

In some embodiments, since the virtual boundary is treated as a "picture boundary" for inter CUs in the clean area, the reconstructed pixels in the dirty area of reference pixels will be padded from the reconstructed pixels in the clean area (or set to a pre-determined value, e.g., $2^{BD-1}$, which will give prediction blocks freedom to reference the entire reference pictures instead of being limited to the clean areas of reference pictures. In some embodiments, since the virtual boundary is treated as a "picture boundary" for inter CUs in the clean area, the coding information in dirty areas of reference pictures are considered "not available", which will prevent CUs in the clean area from using the coding information in dirty areas of reference pictures via TMVP.

In history-based motion vector prediction (HMVP) approaches for inter coding, an HMVP table is created which records HMVP candidates. In some embodiments, the HMVP table is maintained and the motion information of the previous coded blocks updates the HMVP table on-the-fly by appending the candidate to the last entry of the table after encoding or decoding an inter block. As such, the HMVP candidates act as additional modes for skip or direct modes to enhance coding efficiency. According to many video encoding/decoding approaches, an HMVP table can comprise a series of HMVP candidates for intra prediction based upon reference CUs from within both the clean area and the dirty area. In some embodiments, a separate or replacement HMVP table can be created and maintained that includes HMVP candidates from only the clean area of the picture.

In some embodiments, inter prediction approaches can include, for instance, using an extended merge prediction list for motion vectors and merge mode with motion vector differences (MVD) to better represent motion parameters obtained from neighboring CUs, and the adaptive motion vector resolution (AMVR), allowing to code MVDs with different precision. Affine motion compensated predictions can support zooming, rotation and other transformations in addition to simple translation motions, triangle partition to apply more precise predictions within a CU, and decoder side motion vector refinement (DMVR) which allows the decoder to search for better motion vectors around the ones signaled in the bitstream in the reference picture lists. Other available tools are: symmetric MVD (SMVD), bi-prediction with CU weights (BCW), subblock-based temporal merging, bi-directional optical flow (BDOF), and combined inter and intra prediction (CIIP).

According to some embodiments, VVC can use large block-size transforms up to 64×64 that are useful in particular at high resolutions and introduces new primary transforms: namely DST-VII and DCT-VIII. Another tool is the low frequency non-separable transform (LFNST), or reduced secondary transform, that can be applied between the transform and the quantization at the encoder side and between de-quantization and inverse transform at the decoder side. Sub-block transform (SBT) can be used for inter-predicted CUs, allowing to code just a portion of the residual block. Concerning quantization, the maximum QP in VVC is extended from 51 to 63 and a new method called dependent quantization (DQ) is included in order to reduce as much as possible the distortion of the reconstructed vectors by defining the available value levels for transform coefficients considering previous levels in reconstruction order. Chroma residuals can be coded jointly.

In some embodiments, an Entropy Coding process can comprise CABAC and the decoding decision in VVC can use a new two state model for each context instead of a look-up table (LUT) as in HEVC.

In some embodiments, a new in-loop filter can be added after the deblocking and the Sample Adaptive Offset (SAO) filters, such as the Adaptive Loop Filter (ALF). In some embodiments, the ALF reduces blurring and ringing artifacts, and in general, those artifacts that are not removed by the two previous filters. The luma mapping and chroma scaling tool (LMCS) can also be used before the in-loop filters to reshape luma components and improve rate distortion for both SDR and HDR content.

In some embodiments, High Level Syntax (HLS) of the video codec can be revised such that CTUs can be organized in slices, bricks, tiles, etc. in order to improve robustness and parallel decoding operations and sub-pictures to enable independent extraction and decoding of portions of a picture (useful for example in omni-directional viewport-based application scenarios). In some embodiments, signaling can be achieved with syntax structures such as sequence parameters set (SPS) and picture parameters sets (PPS), video parameter set (VPS) and the new adaptation parameter set (APS) and decoding parameter set (DPS). APS carries ALF, luma mapping with chroma scaling parameters and scaling list matrices, while DPS conveys bitstream constraints such as profile, tier and level, facilitating splicing operations.

In some embodiments, an SPS syntax table may be provided. In some embodiments,

A syntax called gdr_virtual_boundaries_treated_as_pic_boundaries_flag is added in SPS syntax table, such as the elements provided in Table 1:

TABLE 1

| Syntax included in SPS Syntax Table | |
| --- | --- |
| | Descriptor |
| seq_parameter_set_rbsp( ) { | |
| ...... | |
| gdr_enabled_flag | u(1) |
| if( gdr_enabled_flag ) | |
| gdr_virtual_boundaries_treated_as_pic_boundaries_flag | u(1) |
| ... ... | |
| } | |

In some embodiments, when the gdr_virtual_boundaries_treated_as_pic_boundaries_flag is equal to 1, the flag specifies that virtual boundaries of each coded GDR picture in the CLVS are treated as picture boundaries for CUs in clean area in the decoding process. In some embodiments, when the gdr_virtual_boundaries_treated_as_pic_boundaries_flag is equal to 0, the flag specifies that virtual boundaries of each coded GDR picture in the CLVS are not treated as picture boundaries for CUs in clean area in the decoding process. When not present, the value of gdr_virtual_boundaries_treated_as_pic_boundaries_flag is considered to be equal to 0.

Letting (xCb, yCb) specify the top-left sample of a current coding block relative to the top left luma sample of the current picture, cbWidth specifies the width of the current coding block in luma samples, and cbHeight specifies the height of the current coding block in luma samples.

For vertical gdr applications, with gdr_virtual_boundaries_treated_as_pic_boundaries_flag set to 1 (or virtual boundary treated as "picture boundary"), a current CU is in a clean area if xCb+cbWidth is smaller than (vertical) virtual boundary 8*ph_virtual_boundaries_pos_x[0] specified in Picture Header syntax table of VVC.

For horizontal gdr applications, with gdr_virtual_boundaries_treated_as_pic_boundaries_flag set to 1 (or horizontal boundary treated as "picture boundary"), a current CU is in clean area if yCb+cbHeight is smaller than (horizontal) virtual boundary 8*ph_virtual_boundaries_pos_y[0] specified in Picture Header syntax table of VVC.

With gdr_virtual_boundaries_treated_as_pic_boundaries_ flag set to 1 (or virtual boundary treated as "picture boundary"), for intra CUs in clean area, the reference samples in dirty area are considered "not available", and therefore, if needed, they will be replaced by the reference samples from the clean area according to the current VVC design.

With gdr_virtual_boundaries_treated_as_pic_boundaries_ flag set to 1 (or virtual boundary treated as "picture boundary"), for inter CUs in clean area, the reconstructed pixels in dirty area of reference pixels will be padded from the reconstructed pixels in clean area (or set to a pre-determined value, e.g. $2^{(BD-1)}$), which will give prediction blocks the freedom over the entire reference pictures, instead of being limited to the clean areas of reference pictures.

With gdr_virtual_boundaries_treated_as_pic_boundaries_ flag set to 1 (or virtual boundary treated as "picture boundary"), for inter CUs in clean area, the coding information in dirty areas of reference pictures are considered "not available", which will prevent CUs in clean area from using the coding information in dirty areas of reference pictures via TMVP.

With gdr_virtual_boundaries_treated_as_pic_boundaries_ flag set to 1 (or virtual boundary treated as "picture boundary"), for CUs in clean area, a separate HMVP table is maintained and updated, which contains only the coding information of previously-coded CUs in clean area. The coding information associated with CUs in dirty area will therefore not be included in the merge list.

In some embodiments, a reference picture resampling (RPR) mechanism can be used in which pictures in the reference lists can be stored at a different resolution from the current picture and then resampled in order to perform regular decoding operations. The inclusion of this technique supports various application scenarios such as real-time communication with adaptive resolution, adaptive streaming with open GOP structures, and enhanced omni-directional viewport-based streaming, for example allowing different temporal structures for different part of the picture. RPR allows enables scalability (in particular spatial scalability).

In some embodiments, a method can provide specific tools to improve the quality of the reconstruction of pictures containing equirectangular projections, such as horizontal wrap around motion compensation, which reduces the artifacts generated by the regular padding process for out of bounds samples, using information of the neighboring samples in the projection domain.

In some embodiments, a Intra Block Copy (IBC) to can be used for screen content coding and takes advantage of repeating patterns in text and graphics in the same picture, significantly improving the compression efficiency for this kind of content, in particular for All Intra configurations.

Figure 5:
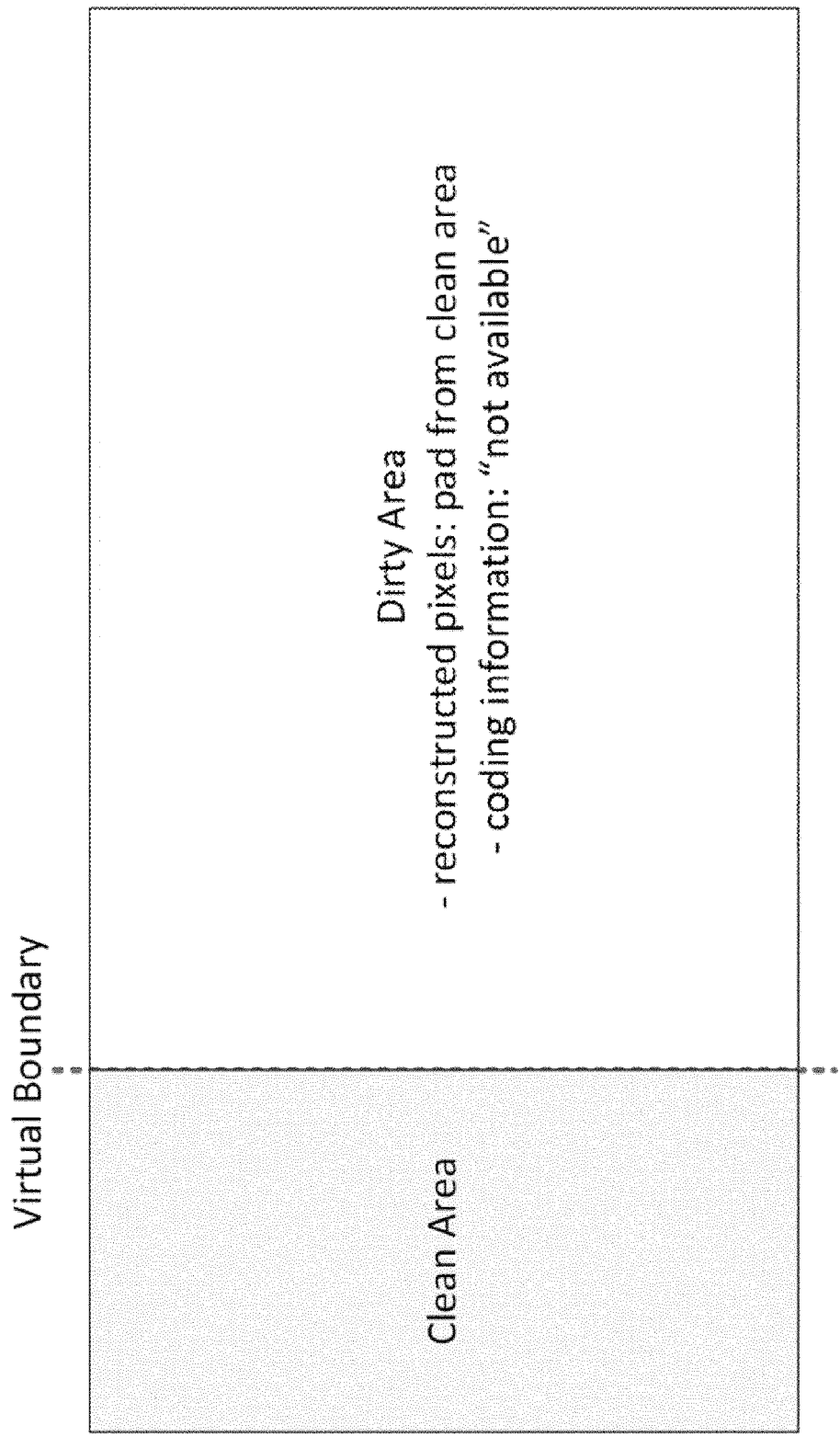
FIG. 5 illustrates an example reference picture for coding units in a clean area of a current picture, according to an embodiment.

FIG. 5 illustrates a reference picture for CUs in a clean area, where the reconstructed pixels in a dirty area are padded from the reconstructed pixels in the clean area and the coding information in the dirty area are considered "not available." With a separate HMVP table containing only the coding information of previously-coded CUs in the clean area for CUs in the clean area, the coding information associated with CUs in the dirty area will not be included in the merge list. In some embodiments, the merge list can be used in order to present the list of HMVP candidates for intra prediction for chronological use in encoding/decoding a picture.

Figure 6:
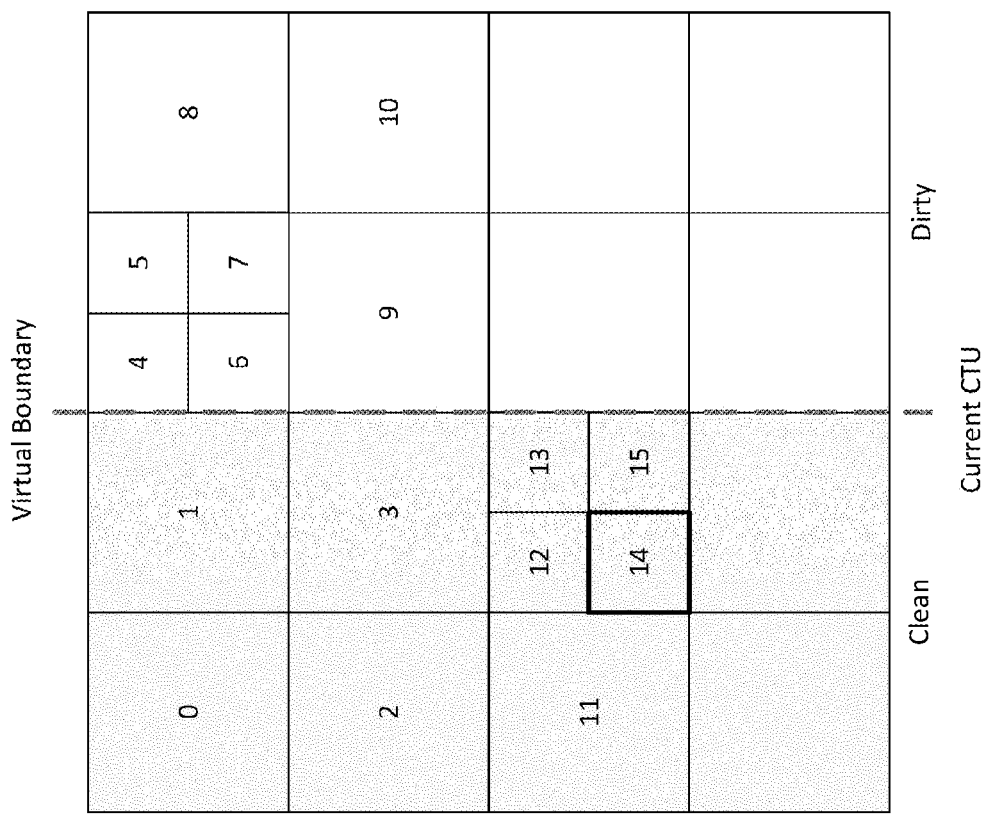
FIG. 6 illustrates a history-based motion vector prediction (HMVP) table for coding units in a clean area, the HMVP table comprising candidates from coding units (CUs) in the clean area for intra prediction, according to an embodiment.

FIG. 6 illustrates an example of a reference picture in which where CU 14 is a current CU in a clean area, and the candidates in a regular HMVP table include CUs 13, 12, 11, 10, and 9, where CUs 10 and 9 are in a dirty area, and the candidates in a separate HMVP table include CUs 13, 12, 11, 3, and 2, all of which are located in a clean area.

Experimental Results

The proposed GDR approach was simulated using VVC Test Model 6 (VTM 6.0) under CE2 test conditions, including:

GDR anchor uses low delay configuration with CRA inserted every second,
GDR tests, where:
 The 1st second is normal low delay configuration, which should match CE2 GDR anchor.
 GDR starts from the 2nd second, and repeats every second.
 GDR refresh rate is set the same as frame rate.
 In calculating a Bjontegaard-Delta (BD) rate, the 1st second results are excluded.

From the VTM 6.0 simulations, none of the GDR tests had a leak, e.g., a memory leak. The results are shown in Table 1. The loss against a CE2 anchor was 3.54%. Note that a loss should be expected because CUs in clean area are not allowed to use any coding information from dirty areas.

|  | Low delay B Main10 Over O-CE2 Anchor (VTM6.0) on Linux | | | | |
| --- | --- | --- | --- | --- | --- |
|  | Y | U | V | EncT | DecT |
| Class A1 |  |  |  |  |  |
| Class A2 |  |  |  |  |  |
| Class B | 2.65% | 4.43% | 8.55% | 89% | 101% |
| Class C | 2.40% | 1.28% | 1.57% | 87% | 101% |
| Class E | 6.54% | 8.71% | 10.90% | 84% | 108% |
| Overall | 3.54% | 4.45% | 6.81% | 87% | 103% |
| Class D | 1.40% | 3.55% | 2.59% | 90% | 108% |
| Class F | 4.83% | 4.40% | 5.56% | 95% | 107% |

For purposes of comparison, results for an encoder only GDR (Vitec CE2.1b) are presented in Table 2.

|  | Low delay B Main10 Over O-CE2 Anchor (VTM6.0) on Linux | | | | |
| --- | --- | --- | --- | --- | --- |
|  | Y | U | V | EncT | DecT |
| Class A1 |  |  |  |  |  |
| Class A2 |  |  |  |  |  |
| Class B | 2.86% | 6.15% | 9.64% | 105% | 101% |
| Class C | 5.62% | 6.74% | 7.33% | 104% | 105% |
| Class E | 13.90% | 16.21% | 18.72% | 112% | 105% |
| Overall | 6.54% | 8.86% | 11.14% | 106% | 104% |
| Class D | 7.68% | 10.82% | 10.15% | 110% | 107% |
| Class F | 32.50% | 39.65% | 40.78% | 121% | 108% |

Without wishing to be bound by any particular theory or characterization, among the various JVET contributions on GDR, Vitec CE2.1b may be the closest to the "encoder only GDR" with vertical virtual boundary. The loss against the CE2 anchor for Vitec CE2.1b was 6.54%. As seen, the GDR approach described herein has a coding gain over the Vitec CE2.1b "encoder only GDR" of around 3%.

Many of the Vitec CE2.1b tests, in particular class B and F sequences, show "leaks," which means their code did not impose enough restrictions on certain coding tools. As such, the performance of such conventional approaches will be worse after imposing the necessary restrictions to stop those "leaks." As such, the approximate reduction in loss against the CE2 anchor illustrated for the disclosed GDR approach as compared to Vitec CE2.1b is likely even bigger than 3%.

As such, the GDR approach described herein improves coding performance over encoder-only GDR (by greater than 3% over Vitec CE21.b), imposes no restrictions on the coding tools for CUs in clean area, avoids complicated validation process (potentially low the cost for VVC encoder with GDR functionality), and makes code structure much cleaner and more simple.

Figure 7:
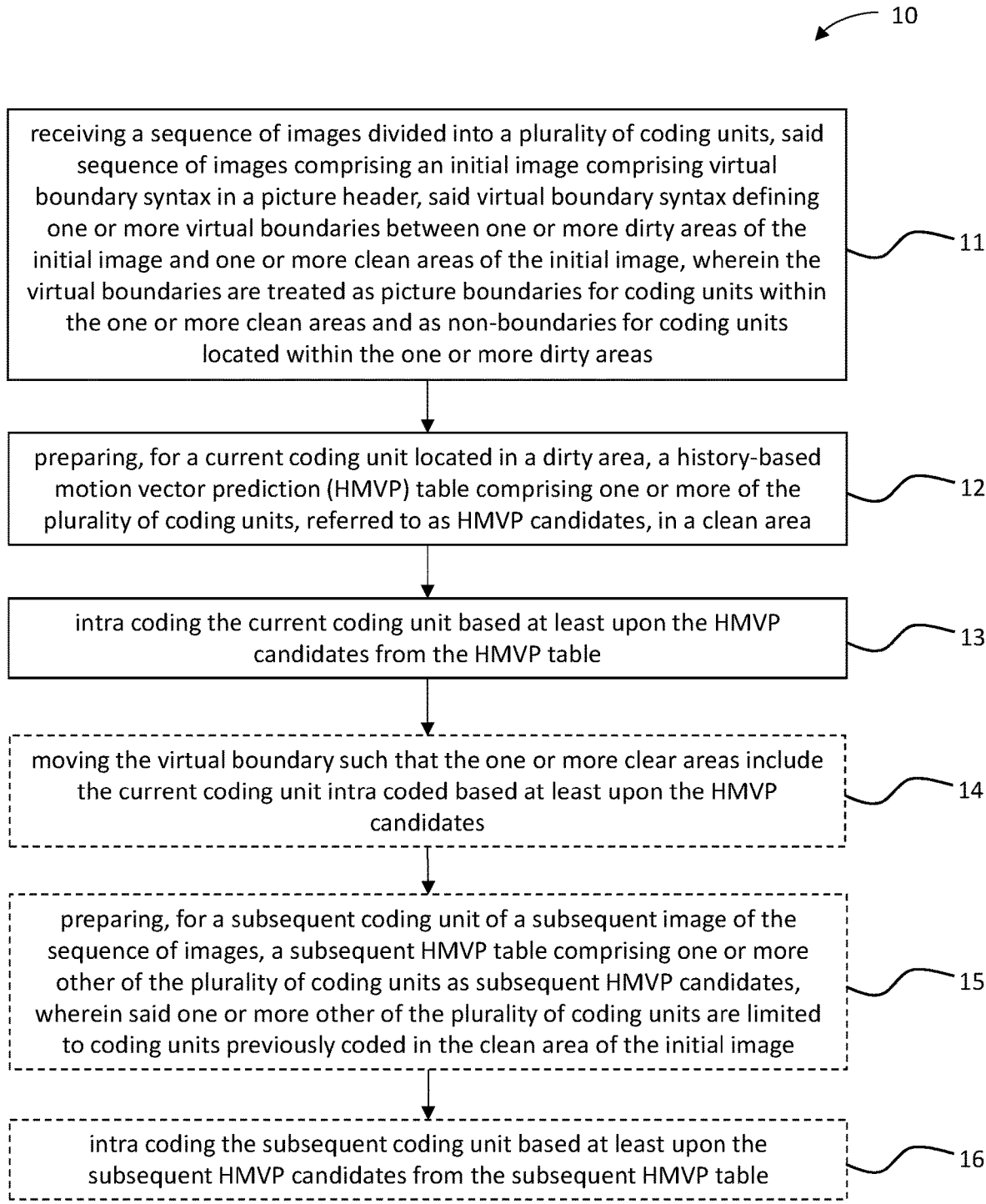
FIG. 7 illustrates a block flow diagram of a method for gradual decoding refresh-based GRA intra coding of coding units in a current picture, according to an embodiment.

Referring now to FIG. 7, a method 10 is illustrated, as a flow diagram, for encoding video and images according to gradual decoding refresh for versatile video coding.

For instance, an apparatus 10 can comprise means, such as the processor 20, the communication interface, or the like, for receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas, at 11. In some embodiments, an initial image may not necessarily be the very first image of a sequence of images, but may instead be an image that precedes one or more other images. In some embodiments, the apparatus 10 can further comprise means, such as the processor 20, the communication interface, or the like, for preparing, for a current coding unit located in a dirty area, a history-based motion vector prediction (HMVP) table comprising one or more of the plurality of coding units, referred to as HMVP candidates, in a clean area, at 12. In some embodiments, the apparatus 10 can further comprise means, such as the processor 20, the communication interface, or the like, for intra coding the current coding unit based at least upon the HMVP candidates from the HMVP table, at 13. In some embodiments, the apparatus 10 can, optionally, further comprise means, such as the processor 20, the communication interface, or the like, for, moving the virtual boundary such that the one or more clean areas include the current coding unit intra coded based at least upon the HMVP candidates, at 14. In some embodiments, the apparatus 10 can, optionally, further comprise means, such as the processor 20, the communication interface, or the like, for preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image, at 15. In some embodiments, the apparatus 10 can, optionally, further comprise means, such as the processor 20, the communication interface, or the like, for intra coding the subsequent coding unit based at least upon the subsequent HMVP candidates from the subsequent HMVP table, at 16.

Figure 8:
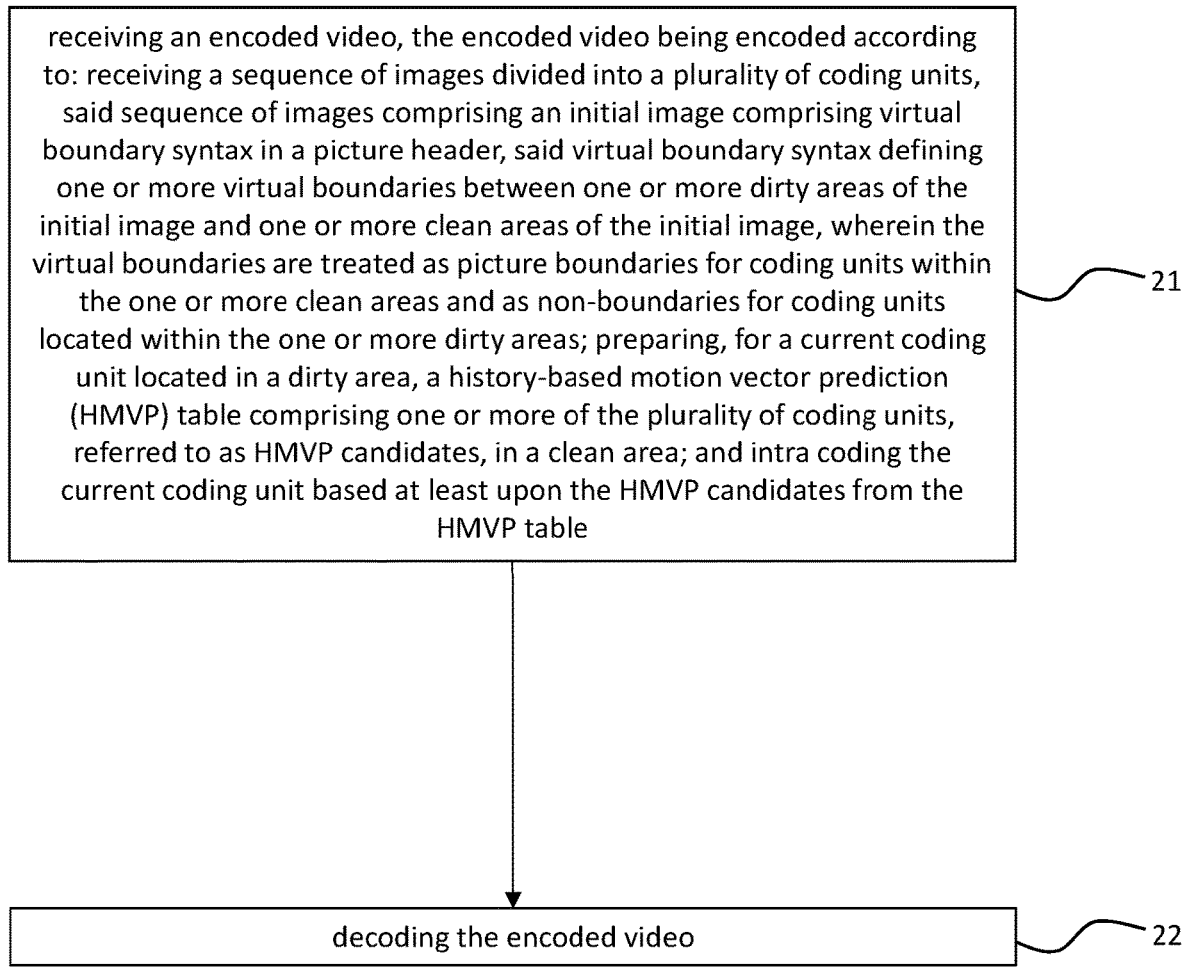
FIG. 8 illustrates a block flow diagram of a method for decoding a video or picture encoded according to gradual decoding refresh-based GRA intra coding of coding units, according to an embodiment.

Referring now to FIG. 8, a method 20 is illustrated, as a flow diagram, for decoding video and images according to gradual decoding refresh for versatile video coding.

For instance, an apparatus 10 of an example embodiment can comprise means, such as the processor 20, the communication interface, or the like, for receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table, at 21. In some embodiments, an initial image may not necessarily be the very first image of a sequence of images, but may instead be an image that precedes one or more other images. In some embodiments, the apparatus 10 can further comprise means, such as the processor 20, the communication interface, or the like, for decoding the encoded video, at 22. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

The various embodiments of the invention can be implemented with the help of computer program code that resides in a memory and causes the relevant apparatuses, such as encoder or decoder, to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

The various embodiments can be implemented with the help of a non-transitory computer-readable medium encoded with instructions that, when executed by a computer, perform the various embodiments.

If desired, the different functions discussed herein may be performed in a different order and/or concurrently with each other. Furthermore, if desired, one or more of the above-described functions may be optional or may be combined. Furthermore, the present embodiments are disclosed in relation to a method for encoding at a coder, however the teachings of the present disclosure can be applied in a decoder configured to perform decoding of encoded/compressed pictures encoded/compressed according to one or more of the methods disclosed herein.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. As described above, while various methods, apparatuses, and computer program products are described herein in conjunction with the VVC approach/protocol, these same methods, apparatuses, and computer program products may be utilized in conjunction with other coding/decoding protocols or techniques.

Some embodiments provide a method for encoding and decoding video information. In some embodiments an apparatus, a computer program product, a computer program product, such as a computer-readable medium, for implementing the method are provided.

For instance, according to a first aspect, there is provided a method comprising receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, an initial image may not necessarily be the very first image of a sequence of images, but may instead be an image that precedes one or more other images. In some embodiments, the method can further comprise moving the virtual boundary such that the one or more clean areas include the current coding unit intra coded based at least upon the HMVP candidates. In some embodiments, the method can further comprise preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the method can further comprise constructing a merge list comprising coding information for only coding units located within the one or more clean areas of the input picture.

According to a second aspect, there is provided an apparatus comprising at least one processor and at least one memory including computer program code with the at least one memory and the computer program code being configured to, with the at least one processor, cause the apparatus to perform at least: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, the at least one memory and the computer program code are further configured to, with the at least one processor, cause the apparatus to perform at least: moving the virtual boundary such that the one or more clean areas include the current coding unit intra coded based at least upon the HMVP candidates. In some embodiments, the at least one memory and the computer program code are further configured to, with the at least one processor, cause the apparatus to perform at least: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the at least one memory and the computer program code are further configured to, with the at least one processor, cause the apparatus to perform at least: constructing a merge list comprising coding information for only coding units located within the one or more clean areas of the input picture.

According to a third aspect, there is provided an apparatus comprising means for receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; means for preparing, for a current coding unit located in a dirty area, a history-based motion vector prediction (HMVP) table comprising one or more of the plurality of coding units, referred to as HMVP candidates, in a clean area; and means for intra coding the current coding unit based at least upon the HMVP candidates from the HMVP table. In some embodiments, the apparatus can further comprise means for moving the virtual boundary such that the one or more clean areas include the current coding unit intra coded based at least upon the HMVP candidates. In some embodiments, the apparatus can further comprise means for, preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and means for intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the apparatus can further comprise means for constructing a merge list comprising coding information for only coding units located within the one or more clean areas of the input picture.

According to a fourth aspect, there is provided a non-transitory computer-readable medium encoded with instructions that, when executed by a computer, perform: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table. In some embodiments, the non-transitory computer-readable medium can be further encoded with instructions that, when executed by the computer, perform: moving the virtual boundary such that the one or more clean areas include the current coding unit intra coded based at least upon the HMVP candidates. In some embodiments, the non-transitory computer-readable medium can be further encoded with instructions that, when executed by the computer, perform: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of a reference sample that includes or may include CUs from within the dirty area of the input picture. In some embodiments, the non-transitory computer-readable medium can be further encoded with instructions that, when executed by the computer, perform: constructing a merge list comprising coding information for only coding units located within the one or more clean areas of the input picture.

According to a fifth aspect, there is provided a method comprising receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to a sixth aspect, there is provided an apparatus comprising at least one processor and at least one memory including computer program code, the at least one memory and the computer program code configured to, with the at least one processor, cause the apparatus to perform at least: receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to a seventh aspect, there is provided an apparatus comprising: means for receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: means for decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

According to an eighth aspect, there is provided a non-transitory computer-readable medium encoded with instructions that, when executed by processing circuitry, perform: receiving an encoded video, the encoded video being encoded according to: receiving a sequence of images divided into a plurality of coding units, said sequence of images comprising an initial image comprising virtual boundary syntax in a picture header, said virtual boundary syntax defining one or more virtual boundaries between one or more dirty areas of the initial image and one or more clean areas of the initial image, wherein the virtual boundaries are treated as picture boundaries for coding units within the one or more clean areas and as non-boundaries for coding units located within the one or more dirty areas; preparing, for a current coding unit located in a dirty area, a history-based motion vector prediction (HMVP) table comprising one or more of the plurality of coding units, referred to as HMVP candidates, in a clean area; and intra coding the current coding unit based at least upon the HMVP candidates from the HMVP table; the method further comprising: decoding the encoded video. In some embodiments, the encoded video is further encoded according to: moving the virtual boundary such that the one or more clean areas include the current coding unit intra coded based at least upon the HMVP candidates. In some embodiments, the encoded video is further encoded according to: preparing, for a subsequent coding unit of a subsequent image of the sequence of images, a subsequent HMVP table comprising one or more other of the plurality of coding units as subsequent HMVP candidates, wherein said one or more other of the plurality of coding units are limited to coding units previously coded in the clean area of the initial image; and intra coding the subsequent coding unit based at least upon the subsequent HMVP candidates from the subsequent HMVP table. In some embodiments, reference samples located within a dirty area of the input picture are designated as not available such that, if a reference sample from within a dirty area of the input picture is needed, a reference sample from within a clean area of the input picture will be provided instead of another reference sample from within the dirty area of the input picture. In some embodiments, the encoded video is further encoded according to: constructing a merge list comprising coding information for only coding units located within the one or more clean areas of the input picture.

It will be appreciated to the skilled reader that any mentioned apparatus/device/server and/or other features of particular mentioned apparatus/device/server may be provided by an apparatus arranged such that they become configured to carry out the desired operations only when enabled, e.g., switched on, or the like. In such cases, they may not necessarily have the appropriate software loaded into the active memory in the non-enabled (e.g., switched off state) and only load the appropriate software in the enabled (e.g., on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g., memory, signal).

It will be appreciated that any "computer" or processor described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signaling" or "signalling" may refer to one or more signals transmitted as a series of transmitted and/or received signals. The series of signals may comprise one, two, three, four or even more individual signal components or distinct signals to make up said signaling. Some or all of these individual signals may be transmitted/received simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the portable electronic devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus comprising:
   a processor; and
   a memory storing computer-readable instructions, wherein the memory and the computer-readable instructions are configured, with the processor, to cause the apparatus to at least:
      receive a sequence of pictures, the sequence of pictures comprising a picture comprising virtual boundary syntax in a picture header, the picture being divided into a plurality of coding units, the virtual boundary syntax defining one or more virtual boundaries between one or more clean areas of the picture and one or more dirty areas of the picture;
      designate the virtual boundaries as picture boundaries for coding units within the one or more clean areas;
      designate the virtual boundaries as non-boundaries for coding units located within the one or more dirty areas; and
   intra code the coding units within the one or more clean areas of the picture, wherein reference samples located within the one or more dirty areas of the picture are designated as not available such that, if one or more reference samples from within the one or more dirty areas of the picture is needed, one or more reference samples from within the one or more clean areas of the picture will be provided for the one or more reference samples from within the one or more dirty areas of the picture.

2. The apparatus of claim 1, wherein the picture is a gradual decoding refresh (GDR) picture or a picture between a GDR picture and an associated recovery point picture.

3. The apparatus of claim 1, wherein the memory and the computer-readable instructions are further configured, with the processor, to cause the apparatus to at least:
   inter code the coding units within the one or more clean areas of the picture based upon at least one or more reference pictures, wherein reconstructed pixels and coding information in one or more dirty areas of the one or more reference pictures are considered to not be available.

4. The apparatus of claim 3, wherein the memory and the computer-readable instructions are further configured, with the processor, to cause the apparatus to at least:
   in an instance in which the reconstructed pixels in the one or more dirty areas of the one or more reference pictures are needed, pad the reconstructed pixels in the one or more dirty areas of the one or more reference pictures from reconstructed pixels in one or more clean areas of the one or more reference pictures.

5. The apparatus of claim 3, wherein the memory and the computer-readable instructions are further configured, with the processor, to cause the apparatus to at least:
   in an instance in which the reconstructed pixels in the one or more dirty areas of the one or more reference pictures are needed, pad the reconstructed pixels in the one or more dirty areas of the one or more reference pictures according to a pre-determined padding value.

6. The apparatus of claim 5, wherein the pre-determined padding value is $2^{BD-1}$, wherein BD is a bit depth associated with the sequence of pictures.

7. The apparatus of claim 3, wherein coding information in the one or more dirty areas of the one or more reference pictures is considered to not be available, and wherein the memory and the computer-readable instructions are further configured, with the processor, to cause the apparatus to at least:

in an instance in which the coding information in the one or more dirty areas of the one or more reference pictures are needed, set the coding information in the one or more dirty areas of the one or more reference pictures to one or more pre-determined values.

8. The apparatus of claim 7, wherein the one or more pre-determined values comprises a non-inter mode value.

9. The apparatus of claim 3, wherein the memory and the computer-readable instructions are further configured, with the processor, to cause the apparatus to at least:
construct a history-based motion vector prediction (HMVP) table comprising only coding information of previously-coded coding units in the one or more clean areas of the picture.

10. The apparatus of claim 3, wherein the memory and the computer-readable instructions are further configured, with the processor, to cause the apparatus to at least:
construct a merge list comprising coding information of only coding units located within the one or more clean areas of the picture.

11. The apparatus of claim 1, wherein the memory and the computer-readable instructions are further configured, with the processor, to cause the apparatus to at least:
intra code or inter code the coding units within the one or more dirty areas of the picture, wherein coding information in both the one or more clean areas and the one or more dirty areas of the picture and coding information in one or more reference pictures are allowed to be used.

12. The apparatus of claim 11, wherein the memory and the computer-readable instructions are further configured, with the processor, to cause the apparatus to at least:
construct a history-based motion vector prediction (HMVP) table comprising the coding information of the previously-coded coding units in both the one or more clean areas and the one or more dirty areas of the picture.

13. A method comprising:
receiving a sequence of pictures, the sequence of pictures comprising a picture comprising virtual boundary syntax in a picture header, the picture being divided into a plurality of coding units, the virtual boundary syntax defining one or more virtual boundaries between one or more clean areas of the picture and one or more dirty areas of the picture;
designating the virtual boundaries as picture boundaries for coding units within the one or more clean areas;
designating the virtual boundaries as non-boundaries for coding units located within the one or more dirty areas; and
intra coding the coding units within the one or more clean areas of the picture, wherein reference samples located within the one or more dirty areas of the picture are designated as not available such that, if one or more reference samples from within the one or more dirty areas of the picture is needed, one or more reference samples from within the one or more clean areas of the picture will be provided for the one or more reference samples from within the one or more dirty areas of the picture.

14. The method of claim 13, wherein the picture is a gradual decoding refresh (GDR) picture or a picture between a GDR picture and an associated recovery point picture.

15. The method of claim 13, further comprising:
inter coding the coding units and coding information within the one or more clean areas of the picture based upon at least one or more reference pictures, wherein reconstructed pixels and coding information in one or more dirty areas of the one or more reference pictures are considered to not be available.

16. The method of claim 15, further comprising:
in an instance in which the reconstructed pixels in the one or more dirty areas of the one or more reference pictures are needed, padding the reconstructed pixels in the one or more dirty areas of the one or more reference pictures from reconstructed pixels in one or more clean areas of the one or more reference pictures.

17. The method of claim 15, further comprising:
in an instance in which the reconstructed pixels in the one or more dirty areas of the one or more reference pictures are needed, padding the reconstructed pixels in the one or more dirty areas of the one or more reference pictures according to a pre-determined padding value.

18. A non-transitory computer-readable medium storing instructions that, when executed by a processor, cause at least the following:
receiving a sequence of pictures, the sequence of pictures comprising a picture comprising virtual boundary syntax in a picture header, the picture being divided into a plurality of coding units, the virtual boundary syntax defining one or more virtual boundaries between one or more clean areas of the picture and one or more dirty areas of the picture;
designating the virtual boundaries as picture boundaries for coding units within the one or more clean areas;
designating the virtual boundaries as non-boundaries for coding units located within the one or more dirty areas; and
intra coding the coding units within the one or more clean areas of the picture, wherein reference samples located within the one or more dirty areas of the picture are designated as not available such that, if one or more reference samples from within the one or more dirty areas of the picture is needed, one or more reference samples from within the one or more clean areas of the picture will be provided for the one or more reference samples from within the one or more dirty areas of the picture.

\* \* \* \* \*